(12) United States Patent
Leman

(10) Patent No.: US 6,679,207 B1
(45) Date of Patent: Jan. 20, 2004

(54) ENGINE VALVE ACTUATION SYSTEM

(75) Inventor: Scott Alan Leman, Eureka, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/370,621

(22) Filed: Feb. 24, 2003

(51) Int. Cl.[7] ................................................. F01L 1/34
(52) U.S. Cl. ........................ 123/90.16; 123/90.15; 123/90.31; 123/90.44
(58) Field of Search ...................... 123/90.15–90.17, 123/90.31, 90.44

(56) References Cited

U.S. PATENT DOCUMENTS

| | | | | |
|---|---|---|---|---|
| 4,084,557 A | * | 4/1978 | Luria | 123/90.16 |
| 4,397,270 A | * | 8/1983 | Aoyama | 123/90.16 |
| 4,530,318 A | * | 7/1985 | Semple | 123/90.17 |
| 4,539,951 A | * | 9/1985 | Hara et al. | 123/90.17 |
| 4,708,101 A | * | 11/1987 | Hara et al. | 123/90.16 |
| 4,714,057 A | * | 12/1987 | Wichart | 123/90.15 |
| 4,724,822 A | * | 2/1988 | Bonvallet | 123/90.16 |
| 6,237,551 B1 | | 5/2001 | Macor et al. | 123/90.15 |

* cited by examiner

*Primary Examiner*—Thomas Denion
*Assistant Examiner*—Kyle Riddle
(74) *Attorney, Agent, or Firm*—Finnegan, Henderson, Farabow, Garrett & Dunner

(57) ABSTRACT

A valve actuation system is provided. The system includes an engine valve moveable between a first position where the engine valve prevents a flow of fluid relative to the engine valve and a second position where the engine valve allows a flow of fluid relative to the engine valve. A first cam is rotated to move the engine valve from the first position to the second position during a first lift period. A second cam is rotated to affect movement of the engine valve between the first position and the second position during a second lift period. A phase shifting device is operatively connected to the second cam and is adapted to adjust the rotational phase of the second cam relative to the first cam, thereby adjusting the relative timing between the first lift period and the second lift period.

22 Claims, 3 Drawing Sheets

ENGINE VALVE ACTUATION SYSTEM

TECHNICAL FIELD

The present invention is directed to a system and method for actuating engine valves and, more particularly, the present invention is directed to a variable engine valve actuation system.

BACKGROUND

The operation of an internal combustion engine, such as, for example, a diesel, gasoline, or natural gas engine, may cause the generation of undesirable emissions. These emissions, which may include particulates and oxides of nitrogen ($NO_x$), are generated when fuel is combusted in a combustion chamber of the engine. An exhaust stroke of an engine piston forces exhaust gas, which may include these emissions, from the engine. If no emission reduction measures are in place, these undesirable emissions will eventually be exhausted to the environment.

Research is currently being directed towards decreasing the amount of undesirable emissions that are exhausted to the environment during the operation of an engine. It is expected that improved engine design and improved control over engine operation may lead to a reduction in the generation of undesirable emissions. Many different approaches, such as, for example, exhaust gas recirculation, water injection, fuel injection timing, and fuel formulations, have been found to reduce the amount of emissions generated during the operation of an engine. Aftertreatments, such as, for example, traps and catalysts, have been found to effectively remove emissions from an exhaust flow. Unfortunately, the implementation of these emission reduction approaches typically results in a decrease in the overall efficiency of the engine.

Additional efforts are being focused on improving engine efficiency to compensate for the efficiency loss due to the emission reduction systems. One such approach to improving the engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston. Selective implementation of a variation on the conventional actuation timing, such as the Miller cycle, may lead to an improvement in the overall efficiency of the engine.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation. As described in U.S. Pat. No. 6,237,551 to Macor et al., issued on May 29, 2001, a "late intake" Miller cycle may be implemented in such a cam arrangement by modifying the shape of the cam to overlap the actuation of the intake valve with the start of the compression stroke of the piston.

However, while valve actuation timing adjustments may provide efficiency benefits, these actuation timing adjustments may also result in detrimental engine performance under certain operating conditions. For example, a late intake Miller cycle may be inefficient when the engine is starting, operating under cold conditions, or experiencing a transient condition, such as a sudden increase in engine load. This detrimental engine performance is caused by a decrease in the mass of air flowing through the engine. Especially under cold ambient conditions, the delayed start of compression may lead to insufficient cylinder temperatures to support good combustion and startability.

Thus, to obtain the greatest gains from implementing a variation on conventional valve actuation timing, an engine requires a variable valve actuation system. As noted above, the actuation timing of a valve system driven by a cam arrangement is determined by the shape of the driving cam. Because the shape of the cam is fixed, this type of arrangement is inflexible and may only be changed during the operation of the engine through the use of complex mechanical mechanisms.

The engine valve actuation system and method of the present invention solves one or more of the problems set forth above.

SUMMARY OF THE INVENTION

In one aspect, the present invention is directed to a valve actuation system. The system includes an engine valve moveable between a first position where the engine valve prevents a flow of fluid relative to the engine valve and a second position where the engine valve allows a flow of fluid relative to the engine valve. A first cam is rotatable to move the engine valve from the first position to the second position during a first lift period. A second cam is rotatable to affect movement of the engine valve between the first position and the second position during a second lift period. A phase shifting device is operatively connected to the second cam and is adapted to adjust the rotational phase of the second cam relative to the first cam, thereby adjusting the relative timing between the first lift period and the second lift period.

In another aspect, the present invention is directed to a method of actuating an engine valve having a first position where the engine valve prevents a flow of fluid relative to the engine valve and a second position where the engine valve allows a flow of fluid relative to the engine valve. A first cam is rotated to move the engine valve between the first position and the second position during a first lift period. A second cam is rotated to affect movement of the engine valve between the first position and the second position during a second lift period. The rotational phase of the second cam is adjusted, thereby adjusting the relative timing between the first lift period and the second lift period.

DETAILED DESCRIPTION

Figure 1:
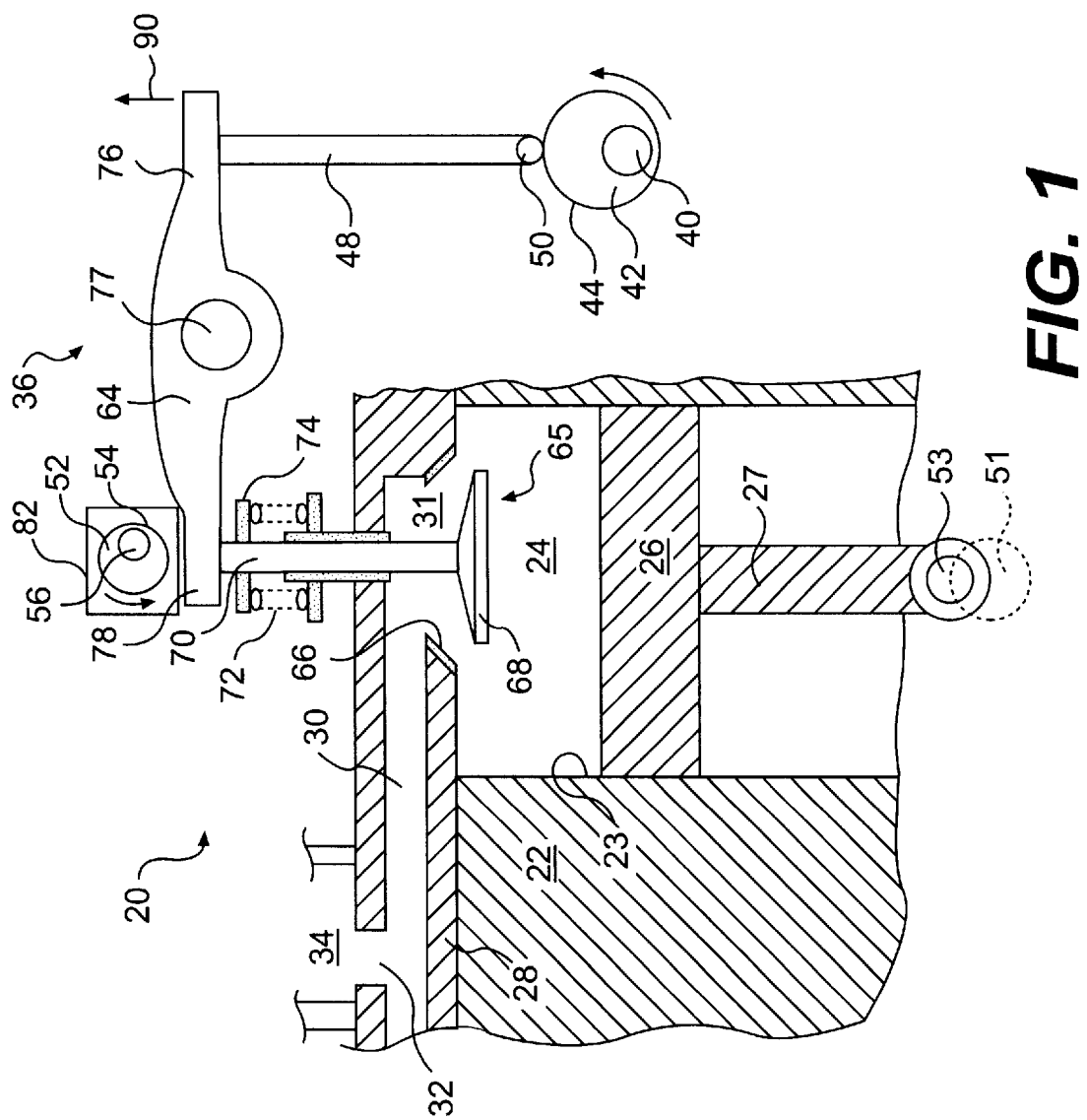
FIG. 1 is a schematic and diagrammatic illustration of an engine valve actuation system in accordance with an exemplary embodiment of the present invention.

An exemplary embodiment of an engine 20 is schematically and diagrammatically illustrated in FIG. 1. Engine 20 includes an engine block 22 that defines a plurality of cylinders 23 (one of which is illustrated in FIG. 1). A piston 26 is slidably disposed within cylinder 23 to reciprocate between a top-dead-center position and a bottom-dead-center position.

For the purposes of the present disclosure, engine 20 is described as a four stroke diesel engine. One skilled in the art will recognize, however, that engine 20 may be any other type of internal combustion engine, such as, for example, a gasoline or natural gas engine.

A connecting rod 27 connects piston 26 to an eccentric crankpin 53 of a crankshaft 51. Piston 26 is coupled to crankshaft 51 so that a movement of piston 26 between the top-dead-center position and the bottom-dead-center position results in a rotation of crankshaft 51. Similarly, a rotation of crankshaft 51 will result in a movement of piston 26 between the top-dead-center position and the bottom-dead-center position. In a four stroke diesel engine, piston 26 will reciprocate between the top-dead-center position and the bottom-dead-center position through an intake stroke, a compression stroke, a combustion stroke, and an exhaust stroke.

Engine 20 also includes a cylinder head 28. Cylinder head 28 is engaged with engine block 22 to cover cylinder 23 and define a combustion chamber 24. Cylinder head 28 defines an intake passageway 30 that leads from an intake manifold opening 32 in an intake manifold 34 to an opening 31 into combustion chamber 24. Intake gases may be directed from intake manifold 34 through intake passageway 30 to combustion chamber 24.

Cylinder head 28 may also define an exhaust passageway (not shown) that leads from combustion chamber 24 to an exhaust manifold (not shown). Exhaust gases from combustion chamber 24 may be directed through the exhaust passageway to the exhaust manifold. These exhaust gases may then be directed from engine 20 and exhausted to the environment.

Figure 2:
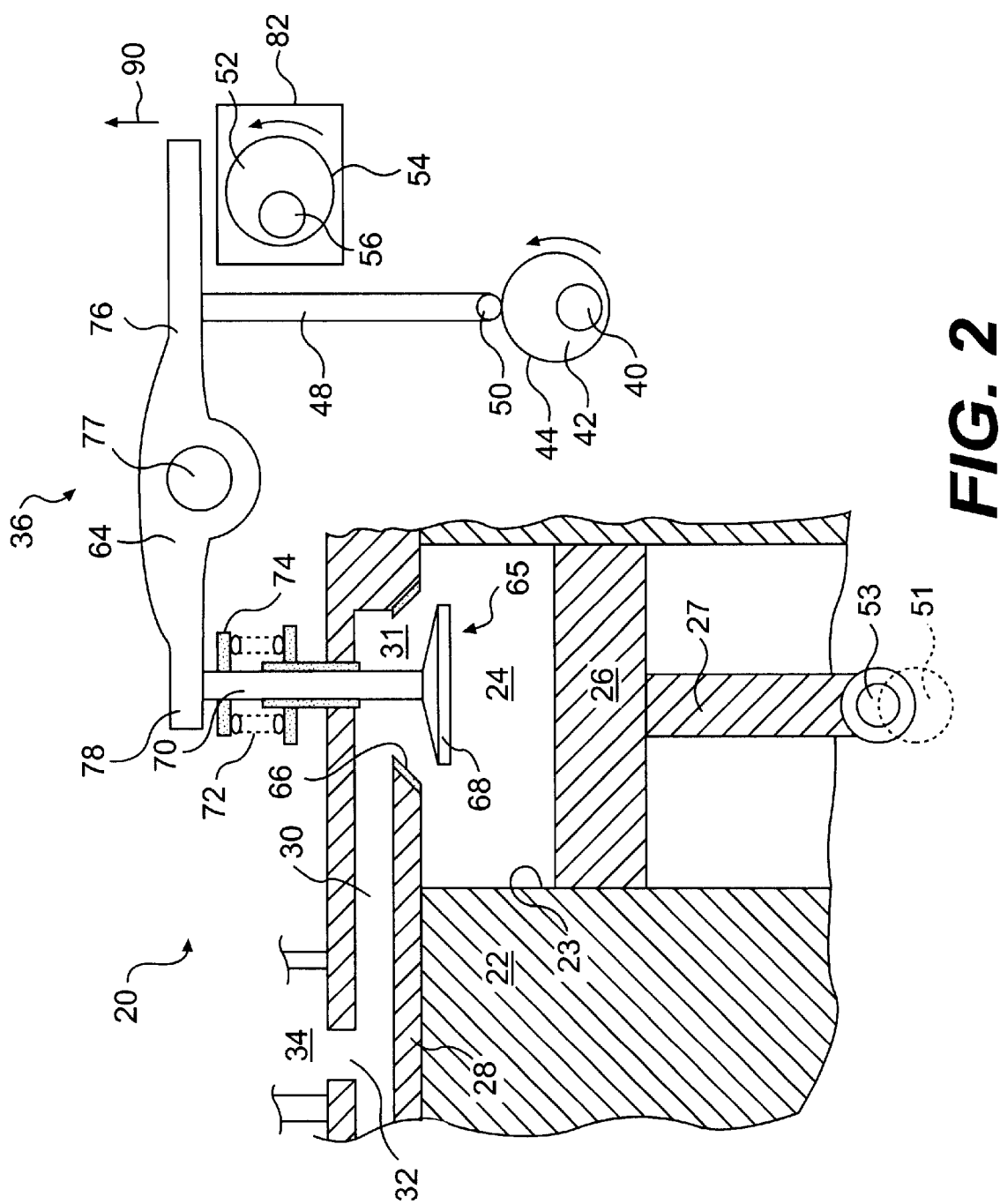
FIG. 2 is a schematic and diagrammatic illustration an engine valve actuation system in accordance with another exemplary embodiment of the present invention.

An intake valve 65 having an intake valve element 68 may be disposed in opening 31. Intake valve element 68 is configured to selectively engage a seat 66 in opening 31. Intake valve element 68 may be moved between a first position where intake valve element 68 engages seat 66 to prevent a flow of fluid relative to opening 31 and a second position (as illustrated in FIGS. 1 and 2) where intake valve element 68 is removed from seat 66 to allow a flow of fluid relative to opening 31.

Engine 20 also includes a cam shaft 40. Cam shaft 40 is operatively engaged with crankshaft 51 of engine 20. Cam shaft 40 may be connected with crankshaft 51 in any manner readily apparent to one skilled in the art where a rotation of crankshaft 51 will result in a corresponding rotation of cam shaft 40. For example, cam shaft 40 may be connected to crankshaft 51 through a gear train that reduces the rotational speed of cam shaft 40 to approximately one half of the rotational speed of crankshaft 51.

An intake cam 42 may be disposed on cam shaft 40 to rotate with cam shaft 40. Intake cam 42 may include a cam lobe 44. As will be explained in greater detail below, the shape of cam lobe 44 on intake cam 42 will determine, at least in part, the actuation timing of intake valve element 68. One skilled in the art will recognize that intake cam 42 may include an additional cam lobe and/or the cam lobe may have a different configuration depending upon the desired intake valve actuation timing.

Engine 20 also includes a series of valve actuation assemblies 36 (one of which is illustrated in FIG. 1). One valve actuation assembly 36 may be provided to move intake valve element 68 between the first and second positions. Another valve actuation assembly 36 may be provided to move an exhaust valve element (not shown) between the first and second positions.

It should be noted that each cylinder 23 may include multiple intake openings 31 and exhaust openings (not shown). Each such opening will have an associated intake valve element 68 or exhaust valve element (not shown). Engine 20 may include two valve actuation assemblies 36 for each cylinder. The first valve actuation assembly 36 may be configured to actuate each of the intake valve elements 68 for each cylinder 23 and the second valve actuation assembly 36 may be configured to actuate each of the exhaust valve elements. Alternatively, engine 20 may include a separate valve actuation assembly to actuate each intake valve element 68 and each exhaust valve element.

Each valve actuation assembly 36 includes a rocker arm 64 that includes a first end 76, a second end 78, and a pivot point 77. First end 76 of rocker arm 64 is operatively engaged with intake cam 42 through a push rod 48 and a cam follower 50. Cam follower 50 remains engaged with the surface of cam lobe 44 as intake cam 42 rotates. The rotation of intake cam 42 causes a reciprocating motion of push rod 48 and a pivoting motion of rocker arm 64 about pivot point 77. Second end 78 of rocker arm 64 is operatively engaged with intake valve element 68 through a valve stem 70.

Valve actuation assembly 36 may also include a valve spring 72. Valve spring 72 may act on valve stem 70 through a locking nut 74. Valve spring 72 may act to move intake valve element 68 relative to cylinder head 28. In the illustrated embodiment, valve spring 72 acts to bias intake valve element 68 into the first position, where intake valve element 68 engages seat 66 to prevent a flow of fluid relative to opening 31. Thus, the rotation of intake cam 42 will cause intake valve 65 to move from the first position to the second position for a first lift period.

A second cam 52 may be operatively engaged with intake valve 65. Second cam may include a cam lobe 54 having, for example, an elliptical surface. Second cam 52 may be mounted on a cam shaft 56 to rotate with cam shaft 56. Second cam 52 may be adapted to affect the movement of intake valve 65. For example, second cam 52 may act to open intake valve 65, delay the movement of intake valve 65, or retard the movement of intake valve 65. As will be explained in greater detail below, under certain circumstances, the rotational phase of second cam 52 may be adjusted so that second cam 52 does not alter the movement of intake valve 65.

As shown in FIG. 1, second cam 52 may be disposed adjacent second end 78 of rocker arm 64. Alternatively, as shown in FIG. 2, second cam 52 may be disposed adjacent first end 76 of rocker arm 64. In either location, second cam 52 is adapted to engage the respective end of rocker arm 64 to cause rocker arm 64 to pivot about pivot point 77 to thereby move intake valve 65 from the first position to the second position for a second lift period.

It should be noted that the second lift period may overlap with the first lift period. In other words, first cam 42 may have already lifted intake valve 65 from the first position before cam lobe 54 of second cam 52 rotates to engage rocker arm 64. In this situation, second cam 52 may not contact rocker arm 64 as first cam 42 may have already caused rocker arm 64 to pivot and lift intake valve 65.

Figure 3:
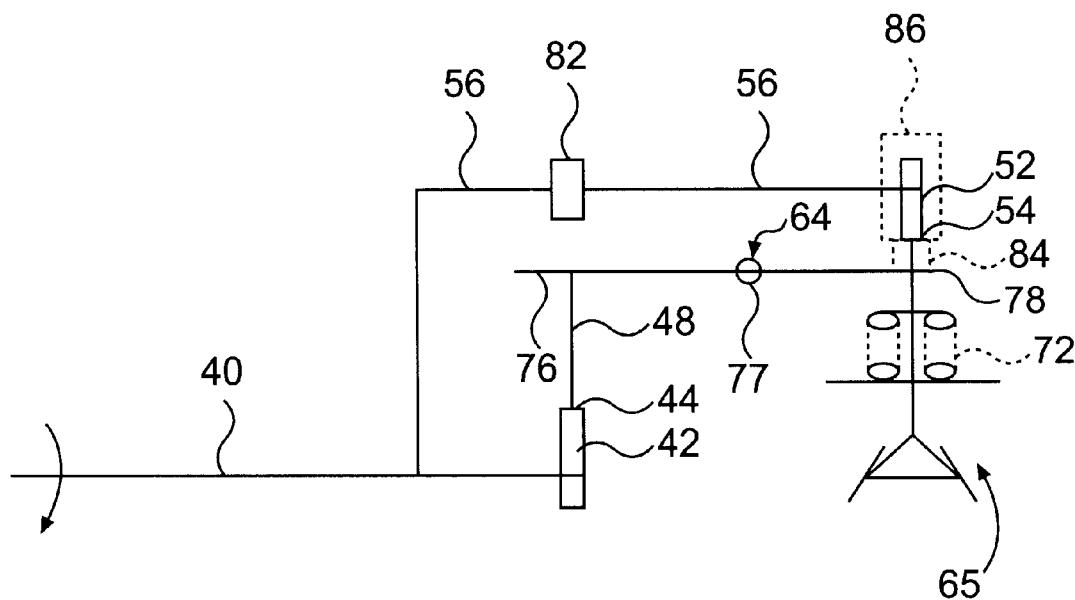
FIG. 3 is a schematic illustration of an engine valve actuation system in accordance with an exemplary embodiment of the present invention.

As schematically shown in FIG. 3, a phase shifting device 82 may be disposed along cam shaft 56. Phase shifting device 82 is operable to adjust the rotational phase of cam shaft 56 and/or second cam 52. Phase shifting device 82 may advance or retard the rotational phase of cam shaft 56 and/or second cam 52 relative to cam shaft 40. Once the phase shift is complete, cam shafts 40 and 56 will continue to rotate at the same speed, e.g. approximately one-half the speed of crankshaft 51 (referring to FIGS. 1 and 2). However, the position of cam lobe 54 of second cam 52 will have shifted relative to the position of cam lobe 44 of first cam 42.

Figure 4:
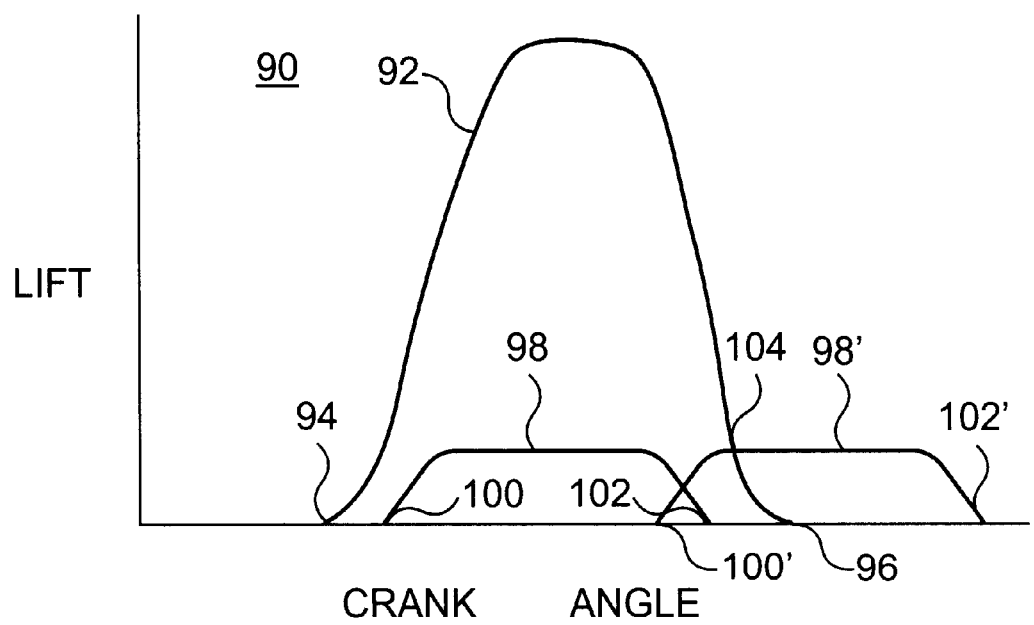
FIG. 4 is a graph illustrating exemplary valve actuation periods for an engine valve actuation system in accordance with the present invention.

For example, FIG. 4 illustrates a graph 90 depicting a first lift period 92 such as may be initiated by first cam 42 and a second lift period 98 such as may be initiated by second cam 52. First lift period 92 includes a start 94 and an end 96. Second lift period includes a start 100 and an end 102. In an exemplary base phasing position, first and second lift periods 92 and 98 will overlap. When the first and second lift periods 92 and 98 overlap, the lifting of intake valve 65 may be controlled entirely by first cam 42.

Phase shifting device 82 may be operated to delay the rotational phase of cam shaft 56 and/or cam 52 with respect to cam shaft 40. A delayed second lift period 98' is also illustrated in FIG. 4. As shown, delayed second lift period 98' has a start 100' and an end 102'. The phase change delays the engagement of second cam 52 with rocker arm 64. Thus, second cam 52 will delay the closing of intake valve 65 to end 102'. Control over the movement of intake valve 65 will be transferred from first cam 42 to second cam 52 at a transfer point 104. Thus, by changing the rotational phase of second cam 52 relative to first cam 42, the actuation period of intake valve 65 may be varied.

Phase shifting devices capable of shifting the phase of a cam are well known in the art. One skilled in the art will recognize that phase shifting device 82 may include any means for changing the rotational phase of a shaft or cam, such a, for example, a cam shaft shift, a cam lobe shift, a hydraulic device, an indexing motor, or a mechanical or hydraulic cam shifting mechanism. In addition, phase shifting device 82 may include a synchronous motor, a mechanical drive with relative angular position based phasing, or any other similar synchronous phasing device.

As shown in FIG. 3, an impact absorbing device 84 may be positioned between second cam 52 and second end 78 of rocker arm 64. Impact absorbing device 84 may include any means for decreasing the impact on rocker arm 64 when second cam 52 engages rocker arm 64. For example, impact absorbing device 84 may be a cam that acts to decelerate the rocker arm or intake valve just prior to transfer point 104. Alternatively, impact absorbing device 84 may include a travel limited hydraulic lifter or a spring/damper combination.

In addition, an adjustment device 86 may be operatively associated with second cam 52 and/or impact absorbing device 84. Adjustment device 86 may be adapted to adjust the position of second cam 52 relative to rocker arm 64. Adjustment device 84 may be used to compensate for manufacturing tolerances and/or changes in the size of components due to temperature changes. Adjustment device 86 may include any means for changing the position of second cam 52 relative to rocker arm 64. For example, adjustment device 86 may include threads, nuts, springs, detents, or any other similar position adjusting mechanism.

INDUSTRIAL APPLICABILITY

The operation of engine 20 will cause a rotation of crankshaft 51, which will cause corresponding rotations of cam shafts 40 and 56. The rotation of cam shaft 40 and first cam 42 causes a reciprocal motion of push rod 48 that pivots rocker arm 64 to start first lift period 92 (referring to FIG. 4) of intake valve 65. First lift period 92 may be coordinated with the movement of piston 26. For example, start 94 of first lift period 92 may coincide with the movement of piston 26 from a top-dead-center position towards a bottom-dead-center position in an intake stroke. The movement of intake valve 65 from the first position to the second position allows a flow of fluid to enter combustion chamber 24.

The rotation of cam shaft 56 will rotate second cam 52 and cam lobe 54 towards rocker arm 64 to initiate second lift period 98 (referring to FIG. 4). However, when second cam 52 is in a base phasing position, second lift period 98 will overlap with first lift period 92. In other words, first cam 42 has already moved intake valve 65 from the first position to the second position and, therefore, cam lobe 54 may not actually engage rocker arm 64 or otherwise impact the lifting movement of intake valve 65.

As first cam 42 and cam lobe 44 continue to rotate, valve spring 72 will act to return intake valve 65 to the first position and end first lift period 92. End 96 of first lift period 92 may, for example, be timed to coincide with the movement of piston 26 to the bottom-dead-center position at the end of the intake stroke. The return of intake valve 65 to the first position prevents additional fluid from flowing into combustion chamber 24.

Phase shifting device 82 may be operated to change the rotational phase of second cam 52 relative to first cam 42. For example, phase shifting device 82 may delay the rotational phase of second cam 52 relative to first cam 42. When the rotational phase of second cam 52 is delayed, the second lift period 98 will be delayed relative to the first lift period 92.

A delay in the rotational phase of second cam 52 may delay the return of intake valve 65 to the first position. In a delayed phase position, cam lobe 54 of second cam 52 will rotate into a position to engage rocker arm 64 at a later time, relative to the motion of first cam 42. This may result in cam lobe 54 engaging rocker arm 64 at transfer point 104 (referring to FIG. 4). Cam lobe 54 will therefore prevent intake valve 65 from returning to the first position until end 102' of delayed second lift period 98'. End 102' of delayed second lift period 98' may be timed to coincide with a certain movement of piston 26. For example, second lift period 98' may be timed to end after piston 26 moves through a first portion of a compression stroke, such as in a "late-intake" type Miller cycle.

The rotational phase of second cam 52 may be adjusted incrementally between the base phasing position and a fully delayed phasing position. An incremental change in the phasing position of second cam 52 will change the time at which intake valve 65 returns to the first position relative to the motion of piston 26. For example, an increased delay in the phasing position of second cam 52 may cause intake valve 65 to return to the first position after piston 26 has completed a greater portion of an intake stroke. A decreased delay in the phasing position of second cam 52 may cause intake valve 65 to return to the first position after piston 26 has completed a lesser portion of an intake stroke. Thus, by changing the rotational phase of second cam 52 the actuation timing of intake valve 65 may be varied.

As will be apparent from the foregoing description, the disclosed system and method provide for the varying of the actuation of an engine valve of an engine. By shifting the rotational phase of a second cam relative to a first cam, the actuation timing of an engine valve, such as an intake valve or an exhaust valve, may be adjusted. The rotational phase of the second cam may be controlled to implement a variation on a conventional valve timing, such as, for example, a late-intake type Miller cycle It will be apparent to those skilled in the art that various modifications and variations can be made in the engine valve actuation system of the present invention without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A valve actuation system, comprising:
   an engine valve moveable between a first position where the engine valve prevents a flow of fluid relative to the engine valve and a second position where the engine valve allows a flow of fluid relative to the engine valve;
   a first cam rotatable to move the engine valve from the first position to the second position during a first lift period;
   a second cam rotatable to affect movement of the engine valve between the first position and the second position during a second lift period; and
   a phase shifting device operatively connected to the second cam and adapted to adjust the rotational phase of the second cam relative to the first cam, the phase shifting device adapted to adjust the phase of the second cam relative to the first cam between a first phase where the second lift period overlaps with the first lift period such that the engine valve returns to the first position at the end of the first lift period and a second phase where the second lift period is delayed with respect to the first lift period such that the engine valve returns to the first position at the end of the second lift period.

2. The system of claim 1, wherein the phase shifting device includes one of a synchronous electric motor and a mechanical drive having a relative angular position based phasing.

3. The system of claim 1, further including a rocker arm having a first end operatively engaged with the first cam and a second end operatively engaged with the engine valve.

4. The system of claim 3, further including a cam follower disposed between the first cam and the first end of the rocker arm.

5. The system of claim 3, wherein the second cam engages the first end of the rocker arm.

6. The system of claim 3, wherein the second cam engages the second end of the rocker arm.

7. The system of claim 3, further including an impact absorbing device disposed between the second cam and the rocker arm.

8. The system of claim 7, wherein the impact absorbing device includes one of a travel limited hydraulic lifter, a spring, and a damper.

9. The system of claim 3, further including an adjustment device adapted to adjust the position of the second cam relative to the rocker arm.

10. A valve actuation system, comprising:
    an engine valve moveable between a first position where the engine valve prevents a flow of fluid relative to the engine valve and a second position where the engine valve allows a flow of fluid relative to the engine valve;
    a first cam rotatable to move the engine valve from the first position during a first lift period;
    a second cam rotatable to affect movement of the engine valve between the first position and the second position during a second lift period; and
    a means for shifting the phase of the second cam to adjust the rotational phase of the second cam relative to the first cam between a first phase where the second lift period overlaps with the first lift period such that the engine valve returns to the first position at the end of the first lift period and a second phase where the second lift period is delayed with respect to the first lift period such that the engine valve returns to the first position at the end of the second lift period.

11. The system of claim 10, further including a rocker arm and a means for absorbing impact between the second cam and the rocker arm.

12. The system of claim 11, further including a means for adjusting the position of the second cam relative to the rocker arm.

13. A method of actuating an engine valve having a first position where the engine valve prevents a flow of fluid relative to the engine valve and a second position where the engine valve allows a flow of fluid relative to the engine valve, comprising:
    rotating a first cam to move the engine valve between the first position and the second position during a first lift period;
    rotating a second cam to affect movement of the engine valve between the first position and the second position during a second lift period; and
    adjusting the rotational phase of the second cam relative to the first cam between a first phase where the second lift period overlaps with the first lift period such that the engine valve returns to the first position at the end of the first lift period and a second phase where the second lift period is delayed with respect to the first lift period such that the engine valve returns to the first position at the end of the second lift period.

14. The method of claim 13, further including absorbing an impact between the second cam and a rocker arm operatively associated with the engine valve.

15. The method of claim 14, further including adjusting the position of the second cam relative to the rocker arm.

16. An engine, comprising:
    a block defining a combustion chamber;
    a crankshaft;
    an engine valve operatively associated with the combustion chamber and moveable between a first position where the engine valve prevents a flow of fluid relative to the combustion chamber and a second position where the engine valve allows a flow of fluid relative to the combustion chamber;
    a first cam operatively connected to the engine valve, the first cam adapted to rotate in response to a rotation of the crankshaft, the rotation of the first cam resulting in a movement of the engine valve from the first position to the second position during a first lift period;
    a second cam operatively connected to the engine valve, the second cam adapted to rotate in response to a rotation of the crankshaft, the rotation of the second cam affecting the movement of the engine valve from the first position to the second position during a second lift period; and
    a phase shifting device operatively connected to the second cam and adapted to adjust the rotational phase of the second cam relative to the first cam, the phase shifting device adapted to adjust the phase of the second cam relative to the first cam between a first phase where the second lift period overlaps with the first lift period such that the engine valve returns to the first position at the end of the first lift period and a second phase where the second lift period is delayed with respect to the first lift period such that the engine valve returns to the first position at the end of the second lift period.

17. The engine of claim 16, wherein the phase shifting device includes one of a synchronous electric motor and a mechanical drive having a relative angular position based phasing.

18. The engine of claim 16, further including:

a rocker arm having a first end operatively engaged with the first cam and a second end operatively engaged with the engine valve; and a cam follower disposed between the first cam and the first end of the rocker arm.

19. The engine of claim 18, wherein the second cam engages the first end of the rocker arm.

20. The engine of claim 18, further including an impact absorbing device disposed between the second cam and the rocker arm.

21. The engine of claim 20, wherein the impact absorbing device includes one of a travel limited hydraulic lifter, a spring, and a damper.

22. The engine of claim 18, further including an adjustment device adapted to adjust the position of the second cam relative to the rocker arm.

* * * * *